US012010260B2

(12) United States Patent
Critzer et al.

(10) Patent No.: US 12,010,260 B2
(45) Date of Patent: Jun. 11, 2024

(54) DETECTING SYNTHETIC SOUNDS IN CALL AUDIO

(71) Applicant: Capital One Services, LLC, McLean, VA (US)

(72) Inventors: Meredith L. Critzer, Midlothian, VA (US); Vahid Khanagha, Rockville, MD (US); Joshua Edwards, Philadelphia, PA (US); Mia Rodriguez, Arlington, VA (US); Tyler Maiman, Melville, NY (US); Aysu Ezen Can, Cary, NC (US); Alexander Lin, Arlington, VA (US); Michael Mossoba, Great Falls, VA (US); Guadalupe Bonilla, Hyattsville, MD (US); Feng Qiu, Newark, DE (US)

(73) Assignee: Capital One Services, LLC, McLean, VA (US)

( * ) Notice: Subject to any disclaimer, the term of this patent is extended or adjusted under 35 U.S.C. 154(b) by 283 days.

(21) Appl. No.: 17/453,431

(22) Filed: Nov. 3, 2021

(65) Prior Publication Data

US 2023/0136241 A1   May 4, 2023

(51) Int. Cl.
*H04M 3/22* (2006.01)
*G10L 15/22* (2006.01)
*G10L 21/028* (2013.01)
*G10L 25/51* (2013.01)
*G10L 25/69* (2013.01)

(52) U.S. Cl.
CPC ........... *H04M 3/2281* (2013.01); *G10L 15/22* (2013.01); *G10L 21/028* (2013.01); *G10L 25/51* (2013.01); *G10L 25/69* (2013.01); *H04M 2201/40* (2013.01); *H04M 2203/301* (2013.01)

(58) Field of Classification Search
CPC ......... G10L 25/69; G10L 25/51; G10L 15/22; G10L 25/21; G10L 25/24; G10L 21/028; G10L 25/93; H04M 3/2281; H04M 2201/40; H04M 2203/301
USPC ......................................................... 704/206
See application file for complete search history.

(56) References Cited

U.S. PATENT DOCUMENTS 9,484,030 B1 *  11/2016  Meaney ................ G10L 15/22
2015/0056951 A1 *  2/2015  Talwar ............... H04W 12/069
                                                         455/26.1

(Continued)

OTHER PUBLICATIONS

Erik Schechter, "Can We Catch Phone Scammers by Their Audio Fingerprints?" Popular Mechanics, Jul. 2, 2014, 6 Pages.

*Primary Examiner* — Md S Elahee
(74) *Attorney, Agent, or Firm* — Harrity & Harrity, LLP

(57) ABSTRACT

In some implementations, a system may capture audio from a call between a calling device and a called device. The system may filter the captured audio to generate a background audio layer. The system may generate an audio footprint that is a representation of sound in the background audio layer. The system may determine that the audio footprint includes a triggering sound footprint based on one or more audio characteristics of the audio footprint. The system may detect synthetic sound based on the audio footprint and after determining that the audio footprint includes the triggering sound footprint, wherein the synthetic sound is indicative of a sound recording. The system may transmit a notification to one or more devices associated with the call based on detecting the synthetic sound.

20 Claims, 6 Drawing Sheets

(56) References Cited

U.S. PATENT DOCUMENTS

2021/0390975 A1* 12/2021 Wang .................. G10L 25/93
2023/0060936 A1* 3/2023 Thiruvenkatanathan ..................
G10L 25/24

* cited by examiner

DETECTING SYNTHETIC SOUNDS IN CALL AUDIO

BACKGROUND

Analyzing audio, commonly referred to as audio mining, is an automated process performed to identify specific characteristics in the content of an audio signal. Audio mining is most commonly used with respect to speech, in particular, in the field of automatic speech recognition, where the analysis tries to identify any spoken words or phrases within the audio.

SUMMARY

Some implementations described herein relate to a system for detecting synthetic sounds in call audio. The system may include one or more memories and one or more processors communicatively coupled to the one or more memories. The one or more processors may be configured to capture audio from a call between a calling device and a called device. The one or more processors may be configured to filter the captured audio to remove one or more voices. The one or more processors may be configured to generate a background audio layer based on filtering the captured audio to remove the one or more voices. The one or more processors may be configured to generate an audio footprint that is a representation of sound in the background audio layer. The one or more processors may be configured to determine that the background audio layer includes a triggering sound pattern based on analyzing the audio footprint. The one or more processors may be configured to detect a synthetic sound pattern in the background audio layer based on determining that the background audio layer includes the triggering sound pattern, wherein the synthetic sound pattern is detected based on at least one of a first portion of the audio footprint sufficiently matching a second portion of the audio footprint, or a portion of the audio footprint sufficiently matching a stored audio footprint, wherein the stored audio footprint is not generated from the captured audio. The one or more processors may be configured to transmit a notification to one or more devices associated with the call based on detecting the synthetic sound pattern.

Some implementations described herein relate to a method for detecting synthetic audio in call audio. The method may include capturing, by a system, audio from a call between a calling device and a called device. The method may include filtering, by the system, the captured audio to generate a background audio layer. The method may include generating, by the system, an audio footprint that is a representation of sound in the background audio layer. The method may include determining, by the system, that the audio footprint includes a triggering sound footprint based on one or more audio characteristics of the audio footprint. The method may include detecting, by the system, synthetic sound based on the audio footprint and after determining that the audio footprint includes the triggering sound footprint, where the synthetic sound is indicative of a sound recording. The method may include transmitting, by the system, a notification to one or more devices associated with the call based on detecting the synthetic sound.

Some implementations described herein relate to a non-transitory computer-readable medium that stores a set of instructions for a system. The set of instructions, when executed by one or more processors of the system, may cause the system to capture audio from a call between a calling device and a called device. The set of instructions, when executed by one or more processors of the system, may cause the system to filter the captured audio to generate a background audio layer. The set of instructions, when executed by one or more processors of the system, may cause the system to generate an audio footprint that is a representation of sound in the background audio layer. The set of instructions, when executed by one or more processors of the system, may cause the system to determine that the captured audio includes synthetic sound based on the audio footprint, wherein the synthetic sound is indicative of a sound recording. The set of instructions, when executed by one or more processors of the system, may cause the system to transmit a notification to one or more devices associated with the call based on determining that the captured audio includes the synthetic sound.

DETAILED DESCRIPTION

Figure 1A:
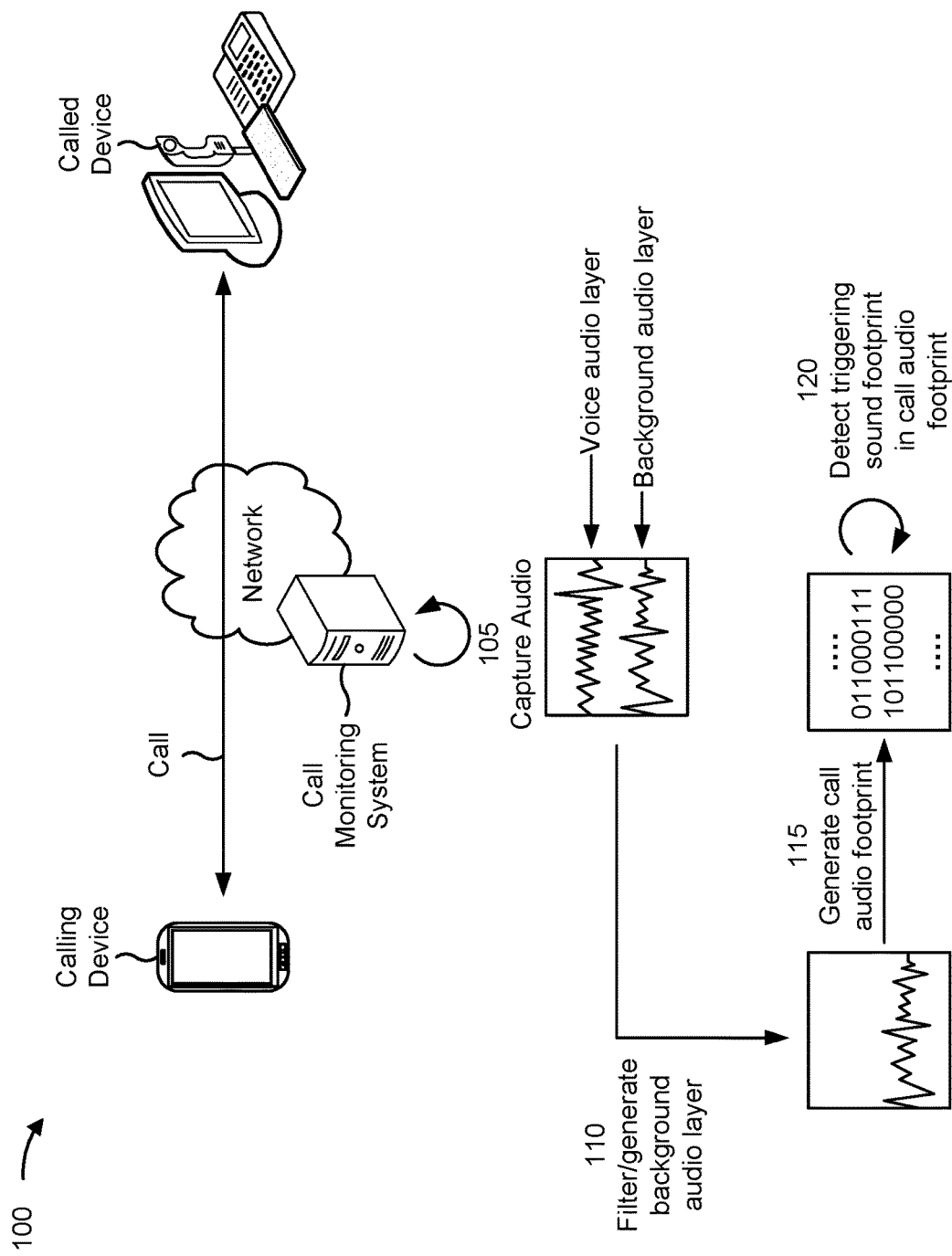
FIGS. 1A-1C are diagrams of an example implementation relating to detecting synthetic sounds in call audio.

The following detailed description of example implementations refers to the accompanying drawings. The same reference numbers in different drawings may identify the same or similar elements.

A caller engaged in a call may use synthetic audio (e.g., an audio recording) for malicious purposes. For example, the caller may play synthetic audio in the background of the call to simulate an urgent and/or sympathetic situation, such as a crying baby, sirens, or the like. A person at the other end of the call, such as an agent, may feel compelled to perform some action for the caller due to the simulated urgency or sympathy (which the agent may not know has been maliciously simulated). For example, the agent may provide the malicious caller with access to an account or may divulge sensitive data without fully vetting the caller's identity and/or without authorizing such access. To mitigate these situations, techniques described herein use a system to detect synthetic sounds in the call audio. Based on detecting synthetic sounds, the system may perform various actions to prevent or mitigate fraudulent activity.

In some implementations described herein, the system may filter out the voice of the caller from audio captured from the call to isolate background noise. The system may then analyze the background noise to determine if there are any anomalies with the background noise (e.g., the background noise matches stored audio previously identified as fraudulent, the background noise is being played on a loop, the background noise is incongruent with other aspects of the call, there are inconsistencies with different sounds in the background noise, etc.). As such, the system may determine from the background noise if the call is fraudulent, and thus may take remedial action in real time (e.g., end the call, send an alert to the agent, lock the account, or the like) and/or subsequent to the call (e.g., contact the account holder, reverse any actions performed to the account during the call, lock the account, or the like) to prevent and/or remedy the unauthorized access to the account and/or data of an account holder.

Furthermore, some implementations described herein conserve processing resources and reduce processing time associated with detecting synthetic audio, which increases the likelihood of detecting synthetic audio while a call is ongoing. For example, some implementations described herein may conserve processing resources by only performing intensive audio analysis if a triggering condition is satisfied. As another example, some implementations described herein may reduce processing time by comparing call audio to other audio in a way that reduces the amount of time to find matching audio (e.g., by comparing audio in a particular order, by identifying a subset of audio samples for the comparison, or the like). By reducing processing time, these implementations enable proactive mitigation techniques to be used while the call is ongoing and perhaps before a malicious action is performed, rather than requiring reactive mitigation techniques to be used after the call and after the malicious action is performed. As a result, computing resources (e.g., processing resources, memory resources, or the like) can be conserved via proactive mitigation rather than reactive mitigation.

Figure 1B:
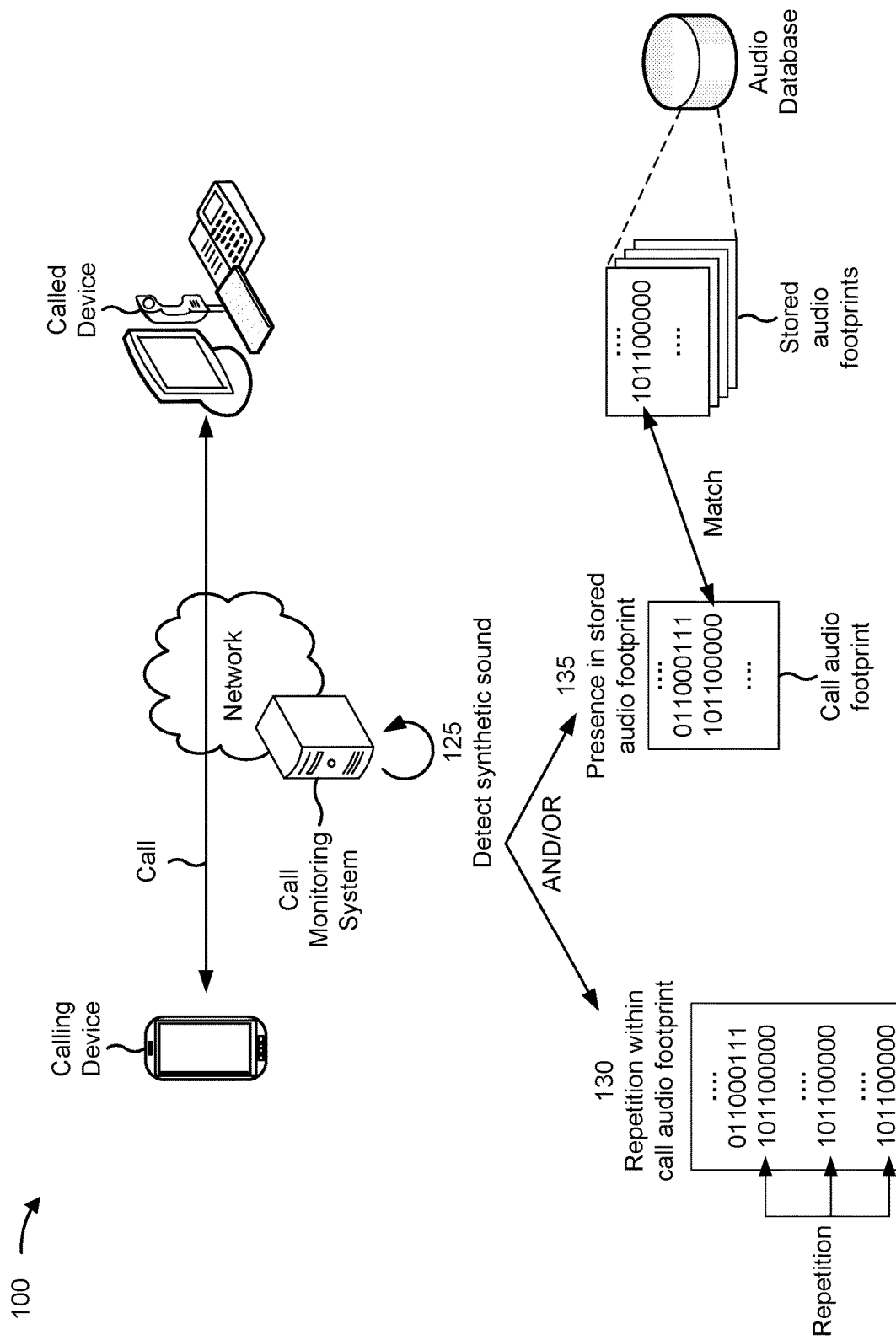
Figure 1C:
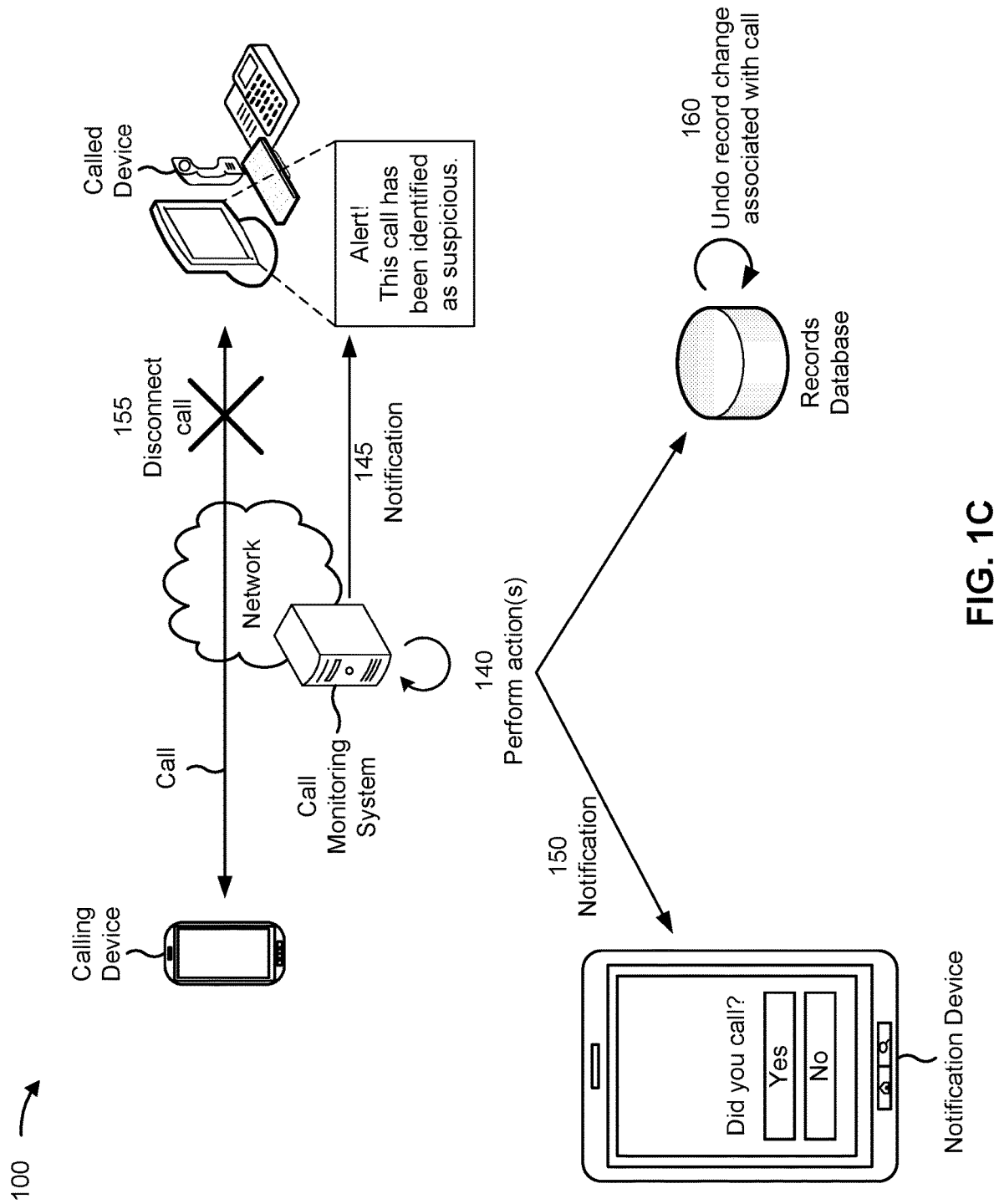

FIGS. 1A-1C are diagrams of an example 100 associated with detecting synthetic sounds in call audio. As shown in FIGS. 1A-1C, example 100 includes a calling device, a called device, a call monitoring system, an audio database, a records database, and one or more notification devices. These devices are described in more detail in connection with FIGS. 2 and 3.

As shown in FIG. 1A, the calling device is engaged in a call with the called device over a network. The call monitoring system monitors the call over the network and captures audio from the call, as shown by reference number 105. In some implementations, the call monitoring system may monitor and/or capture audio from only a single device (e.g., the calling device), which may reduce the processing resources and/or processing time expended by the call monitoring system. For example, the call monitoring system may be configured to monitor and/or capture audio signals traveling in a single direction (e.g., from the calling device to the called device) and/or originating from a particular device (e.g., the calling device), such as by capturing and/or processing only packets that originate at the calling device and/or that are destined for the called device. Alternatively, the call monitoring system may monitor and/or capture audio from both the calling device and the called device.

The captured audio generally includes at least one voice audio layer and at least one background audio layer. A voice audio layer includes one or more audio signals corresponding to one or more voices on the call. For example, the voice audio layer may include a voice of the user of the calling device (e.g., the caller) and/or a voice of the user of the called device (e.g., the called party that is using the called device to participate in the call). A background audio layer includes one or more audio signals corresponding to any remaining sounds on the call (e.g., other than sounds in the voice audio layer). For example, the background audio layer may include background noises from the environment in which the calling device is located and/or background noises from the environment in which the called device is located.

As shown by reference number 110, the call monitoring system may filter the captured audio to remove the voice audio layer (i.e., one or more voices from the call), such that only the background audio layer remains. The call monitoring system may distinguish a voice audio layer from a background audio layer based on one or more audio characteristics of detected audio signals, such as a frequency (e.g., an audio frequency) of the audio signals, a pitch of the audio signals, an amplitude of the audio signals, and/or using speech recognition (e.g., to recognize spoken words), among other examples. For example, to generate the background audio layer, the call monitoring device may remove (e.g., filter or equalize), from the captured audio, audio signals that are within the typical frequency range of human speech.

In implementations in which the call monitoring system monitors and/or captures only audio signals originating from the calling device, the call monitoring system may remove, from the captured audio, a voice originating from the calling device so that the background audio layer includes only background sound that originates from the calling device. In implementations in which the call monitoring system monitors and/or captures audio signals originating from both the calling device and the called device, the call monitoring system may remove, from the captured audio, all the audio (e.g., both the voice audio layer and the background audio layer) originating from the called device, and may remove only the voice originating from the calling device. Thus, the call monitoring system may generate a background audio layer with only background noise (and not voices) from only the calling device.

In some situations, the call audio may include audio signals corresponding to more than one voice originating from the calling device. For example, one voice may be that of the caller and another voice may be that of someone in the background (e.g., a voice from a recording or video playing in the background, another person speaking or yelling in the background, or the like). The call monitoring system may determine which audio signal corresponds to the user's voice, which the call monitoring system would include in the voice audio layer and therefore remove from the captured audio, and which audio signal corresponds to the other voice (or voices), which the call monitoring system would include in the background audio layer.

In some implementations, the call monitoring system may determine which audio signal corresponds to which voice based on one or more audio characteristics of each audio signal (e.g., frequency, pitch, amplitude, or the like). For example, the call monitoring system may include an audio signal with an amplitude that satisfies (e.g., is greater than, or is greater than or equal to) a threshold value (e.g., 45 decibels (dB), 50 dB, 55 dB, 60 dB, or the like) in the voice audio layer, and an audio signal with an amplitude that does not satisfy (e.g., is less than, or is less than or equal to) the threshold value in the background audio layer. Additionally, or alternatively, the call monitoring system may identify an audio signal corresponding to a voice (e.g., the audio signal is within the typical frequency range of human speech) that is the first voice identified from the audio of the calling device (e.g., a voice that occurs earliest in the call as compared to any other voices) as the voice of the caller, and may include that audio signal in the voice audio layer. The call monitoring system may identify any subsequent audio signal corresponding to a voice as belonging to another person other than the user, and may include the subsequent audio signal in the background audio layer. In other implementations, the call monitoring system may include all audio signals corresponding to a voice in the voice audio layer to be removed from the captured audio.

As shown by reference number 115, the call monitoring system may generate a call audio footprint that is a representation of sound in the generated background audio layer.

For example, the call monitoring system may convert the audio signals in the background audio layer into a digital signal, for example, as compressed audio metadata and/or a binary signal as shown in FIG. 1A. In some implementations, the call audio footprint is a compressed version of the background audio layer to conserve memory resources and reduce processing time for a determination of whether the background audio layer (e.g., represented by the call audio footprint) includes synthetic audio. Alternatively, the call audio footprint may be an uncompressed version of the background audio layer, which may improve accuracy of the determination of whether the background audio layer includes synthetic audio.

As shown by reference number 120, the call monitoring system may analyze the call audio footprint to determine whether or not the call audio footprint, and therefore the background audio layer of which the call audio footprint is representative, includes a triggering sound footprint (sometimes called a triggering sound pattern, representative of a particular pattern of sound). The call monitoring system may detect a triggering sound footprint in the call audio footprint based on one or more audio characteristics of the call audio footprint (e.g., amplitude, frequency, pitch, and/or the presence of certain key words in recognized speech). For example, if a portion of the call audio footprint has a sound pattern with an amplitude and/or a frequency that satisfies (e.g., is greater than, or is greater than or equal to) a threshold value (e.g., 70 dB and/or 500 Hz) and/or includes one or more key words (e.g., "emergency," "help," or the like), then the call monitoring system may determine that the portion of the call audio footprint has a triggering sound footprint. The sound pattern may be indicative of a baby crying, a siren sounding, a human yelling, a loud noise, a high-pitched noise, an animal barking or growling, a particular word or phrase, or the like.

The presence of a triggering sound footprint may be indicative of potential fraud associated with the call (e.g., via simulated urgency or simulated sympathy). Thus, if the call monitoring system detects the triggering sound footprint, then the call monitoring system may proceed to perform further analysis to determine if the triggering sound footprint satisfies a condition that indicates a likelihood of fraud associated with the call. If the call monitoring system does not detect a triggering sound pattern in the call audio footprint, then the call monitoring system may refrain from performing any additional analysis, thereby conserving processing resources and/or processing time expended by the call monitoring system.

As shown in FIG. 1B, and by reference number 125, the call monitoring system may determine whether or not a synthetic sound pattern is present (e.g., may detect the synthetic sound pattern) in the captured audio, specifically, in the background audio layer. The presence of a synthetic sound pattern may be indicative of a sound recording, which in turn may be indicative of a likelihood of fraud associated with the call.

In some implementations, the call monitoring system may detect a synthetic sound pattern without first determining that the call audio footprint includes a triggering sound footprint. For example, if the call monitoring system determines that the audio characteristics of the call audio footprint do not satisfy any threshold values (e.g., a sound filter was used such that the amplitude and/or frequency fall below the respective threshold values) and do not include any key words (e.g., the words were not clearly enunciated or were spoken with a strong accent) such that the call monitoring system does not detect a triggering sound footprint, one or more synthetic sound patterns may still be detectable.

Alternatively, the call monitoring system may detect synthetic sound patterns only after first determining that the call audio footprint includes a triggering sound footprint. As such, if the call monitoring system does not detect a triggering sound footprint, then the call monitoring system may refrain from performing any further actions to detect synthetic sounds in the call audio, thereby conserving processing resources, memory, and/or time.

As shown by reference number 130, in some implementations, the call monitoring system may detect the synthetic sound pattern in the call audio footprint if a first portion of the call audio footprint sufficiently matches a second portion of the call audio footprint. Details of the first portion sufficiently matching the second portion are described below. The first portion sufficiently matching the second portion may be indicative of a sound recording (e.g., synthetic audio) being played on loop in the background of the call.

In some implementations, the call monitoring system may isolate a portion of the call audio footprint as the "first portion." For example, the call monitoring system may capture an audio segment, having a minimum duration, from the call audio footprint, as described in more detail below. The call monitoring system may capture the audio segment at a set location within the call audio footprint (e.g., the beginning of the call audio footprint, a portion of the call audio footprint containing the triggering sound footprint, a portion of the call audio footprint that begins or ends with the triggering sound footprint, or a portion of the call audio footprint with the triggering sound footprint in the middle) or at a random location within the call audio footprint. The call monitoring system may then scan and/or analyze the rest of the call audio footprint for a "second portion" that sufficiently matches the first portion.

As shown by reference number 135, in some implementations, the call monitoring system may detect the synthetic sound pattern in the call audio footprint if a portion of the call audio footprint sufficiently matches a stored audio footprint that is not generated from the captured audio (e.g., the stored audio footprint did not originate from the call). The stored audio footprint may be stored in and accessed from an audio database, which generally may store a plurality of stored audio footprints. The stored audio footprints may be an accumulation of audio footprints from one or more sources. For example, the stored audio footprints may be from previous calls (e.g., associated with a particular organization or across multiple organizations), from calls that have previously been identified as being associated with fraud, and/or from the Internet (e.g., audio footprints from specific categories, as described below, for which the call monitoring system searched and obtained from the Internet). Additionally, or alternatively, the stored audio footprints may be arranged in and/or tagged with different categories (e.g., baby crying, sirens, outdoor noises, office noises, or the like).

In some implementations, the call monitoring system may isolate a portion of the call audio footprint. For example, as similarly described above in connection with the sufficient matching between the first and second portions of the call audio footprint, the call monitoring system may isolate and/or capture an audio segment having a minimum duration at a set location within the call audio footprint. In implementations in which the call monitoring system has first detected a triggering sound footprint, this audio segment may include the triggering sound footprint. The call monitoring system may then scan and/or analyze the plurality of stored audio footprints stored in the audio database for a stored audio footprint that sufficiently matches the portion of the call audio footprint (e.g., the audio segment).

In some implementations, the call monitoring system may first determine a category of the triggering sound footprint based on one or more audio characteristics of the triggering sound footprint. The call monitoring system may determine the category from a plurality of set categories (e.g., baby crying, sirens, outdoor noises, office noises, or the like) if the audio characteristics meet one or more conditions for the category, such as if the triggering sound footprint has a frequency within a specific range and/or an amplitude within a specific range. For example, if the triggering sound footprint has a frequency between 750 Hz and 1000 Hz with an increasing and decreasing pattern, the call monitoring system may categorize the triggering sound footprint as a baby crying. When the call monitoring system determines the category of the triggering sound footprint, the call monitoring system may identify, access, and/or analyze (e.g., compare the triggering sound footprint to) only the stored audio footprints having the same or corresponding category (e.g., baby crying) as the triggering sound footprint. As such, the call monitoring system may refrain from searching the entire audio database and/or comparing the triggering sound pattern to all of the stored audio footprints, thereby conserving processing resources, memory, and/or time expended by the call monitoring system (e.g., increasing available processing resources, memory, and/or time). This in turn may increase the likelihood of detecting a synthetic sound while the call is ongoing.

Additionally, or alternatively, the call monitoring system may determine an order for comparing the triggering sound footprint in the portion of the call audio footprint to the plurality of stored audio footprints stored in the audio database. For example, the call monitoring system may determine the order based on a plurality of priority indicators corresponding to the plurality of stored audio footprints. As an example, each priority indicator may indicate a quantity of times that a corresponding stored audio footprint was sufficiently matched. The call monitoring system may identify, access, and/or analyze (e.g., compare the triggering sound footprint to) the stored audio footprints having the highest quantity of previous sufficient matches first, then the next-highest quantity of previous sufficient matches, and so on. Thus, the call monitoring system may efficiently utilize processing resources and/or processing time to detect the synthetic sound pattern by first comparing the triggering sound footprint to stored audio footprints with the highest likelihood of resulting in a sufficient match. Further, after the call monitoring system has detected the synthetic sound pattern (e.g., sufficiently matched the triggering sound footprint and a sound pattern in one of the plurality of stored audio footprints), the call monitoring system may modify the priority indicator (e.g., quantity of sufficient matches) of the stored audio footprint that was sufficiently matched. For example, if the priority indicator is a counter value, then the call monitoring system may increment the counter value.

In some implementations, the call monitoring system may determine a sufficient match between two audio portions (e.g., the first portion and the second portion described above in connection with reference number 130, or the portion and the stored audio footprint or a portion of the stored audio footprint described above in connection with reference number 135) if the two audio portions exactly match one another. Additionally, or alternatively, the call monitoring system may determine that two audio portions sufficiently match one another based on similarities between one or more corresponding audio characteristics of the audio portions within a defined threshold. For example, across a duration of the audio portions, a first audio portion may deviate from a second audio portion in amplitude within a threshold amount (e.g., 5 dB), in period (e.g., slowed down or sped up) within a threshold amount (e.g., 10 milliseconds (ms)), and/or in frequency within a threshold amount (e.g., 50 Hz). Thus, the call monitoring system may still detect a synthetic sound pattern even when the two audio portions do not exactly match, which may result from a number of scenarios. As an example, the calling device and/or the caller may be at or may move to a distance away from a source of the background noise (e.g., a sound recording) such that there may not be an exact amplitude match. As another example, the caller may deliberately apply different filters to different loops to alter the audio characteristics to try to thwart detection. Additionally, or alternatively, if the audio portions include speech, the call monitoring system may determine that the audio portions sufficiently match one another if the call monitoring system recognizes the same words in the same order in the audio portions.

Generally, an audio portion isolated by the call monitoring device may have a threshold duration. For example, the threshold duration may have a lower limit that is greater than or equal to a first threshold value (e.g., 5 seconds) and an upper limit that is less than or equal to a second threshold value (e.g., 30 seconds). As such, the audio portion may be of a sufficient duration to have a distinct sound pattern (e.g., a distinct pattern of variations in one or more of amplitude, pitch, frequency, and/or period, and/or a distinct order of spoken words), such as in the triggering sound footprint. As an example, the audio portion may include the triggering sound footprint, starting a set amount of time (e.g., 5 seconds) before the start of the triggering sound footprint and/or ending a set amount of time (e.g., 5 seconds) after the end of the triggering sound footprint. Thus, if one audio portion is the same or similar as the other audio portion having the distinct sound pattern, then there is a high likelihood that the captured audio includes a synthetic sound (e.g., a recording) being played and/or repeated in the background of the call. In contrast, if the duration of the audio portion is too short (e.g., less than the first threshold value), then the sound pattern or audio characteristics used for comparison may be more common (e.g., due to fewer characteristics needing to be matched), and the number of sufficient matches between audio portions would increase, thereby increasing the chances of falsely detecting synthetic sound. If the duration of the audio portion is too long (e.g., greater than the second threshold value), then the chances of a sufficient match between audio portions would decrease, and the chances of missing detecting synthetic sound would increase.

In some implementations, the call monitoring system may detect the synthetic sound pattern if the call monitoring system determines that the call audio footprint (e.g., the background audio layer) has a first portion and a second portion that are inconsistent with one another. The call monitoring system may make this determination based on one or more audio characteristics of each portion and/or one or more rules or conditions stored and/or applied by the call monitoring system. The rules generally may define what conditions constitute an inconsistency between the first portion and the second portion. For example, one rule may be that an inconsistency exists if the first portion has a frequency within a specified first range and the second portion has a frequency within a specified second range, where the two ranges are separated by a set amount. Additionally, or alternatively, the call monitoring system (e.g., using a trained machine learning model) may identify a particular category of sound (e.g., a baby crying, sirens, office sounds, outdoor sounds or the like) for each portion based on one or more of the audio characteristics of each portion. The rules may indicate pairs or groups of categories that are inconsistent with one another (e.g., a baby crying with office sounds, office sounds with outdoor sounds, or the like). As an example, the first portion may have a frequency between 750 Hz and 1000 Hz, which the call monitoring system may categorize as a baby crying, and the second portion may have a frequency under 10 Hz, which the call monitoring system may categorize as an office sound (e.g., typing on a keyboard). The call monitoring system may then apply one or more rules to determine that the high frequency of the first portion and the low frequency of the second portion and/or that the categories of the portions mean the portions are inconsistent with each other. Thus, the call monitoring system may determine that a synthetic sound pattern exists in the first portion and/or the second portion.

In some implementations, the call monitoring system may detect the synthetic sound pattern if the call monitoring system determines that the call audio footprint (e.g., the background audio layer) includes a first portion, indicative of a muted sound, and a second potion indicative of an unmuted sound other than voice audio. A muted sound may have an amplitude below a threshold value (e.g., 10 decibels), and an unmuted sound may have an amplitude at or above the threshold value. Additionally, or alternatively, a muted sound may have one or more sound quality characteristics indicative of low sound quality (e.g., low fidelity and/or intelligibility of the sound). For example, a muted sound may have a signal-to-noise ratio below a threshold value (e.g., less than or equal to 0 dB). As an example, the call monitoring system may determine that the call audio footprint includes a synthetic sound pattern if most (or all) of the background audio is muted except for one part of the background audio that is unmuted, then the part that is unmuted may be a sound recording that the caller is deliberately transmitting without muting (e.g., the unmuted part is or includes the synthetic sound pattern).

In some implementations, the call monitoring system may detect the synthetic sound pattern if the call monitoring system determines that the call audio footprint (e.g., the background audio layer) includes a characteristic indicative of recorded audio. The characteristic may include, for example, a pause or break in the call audio footprint and/or a sudden change in frequency and/or amplitude of the call audio footprint (e.g., within a threshold amount of time). Additionally, or alternatively, the call monitoring system may monitor and/or measure one or more audio characteristics including, for example, frequency range, signal-to-noise ratio, spurious-free dynamic range, distortion ratio, and/or percent of total harmonic distortion. If one or more of the measurements are greater than a respective threshold or less than a respective threshold indicative of sound being output via a speaker, then the call monitoring system may determine that the call audio footprint includes recorded audio (e.g., synthetic sound).

As shown in FIG. 1C, and by reference number 140, after the call monitoring system detects a synthetic sound pattern in the captured audio (e.g., in the background audio layer), the call monitoring system may perform one or more actions. The one or more actions may serve to prevent, mitigate, and/or rectify any consequences resulting from potential fraud associated with the call, which the detection of the synthetic sound pattern indicates is likely.

In some implementations, the call monitoring system may transmit a notification to one or more devices associated with the call. In some implementations, the recipient of the notification may be based on whether the call is ongoing or has ended. For example, the call monitoring system may determine whether the call is ongoing or has ended. The call monitoring system may then identify one or more devices to which the notification is to be transmitted based on whether the call is ongoing or has ended. As an example, if the call is ongoing, the call monitoring system may transmit the notification to a device associated with a call center representative, the called party, a holder of an account of which the call is the subject (the account holder), or the like. If the call has ended, the call monitoring system may transmit the notification to a device associated with an investigations team, an account manager, the account holder, law enforcement, or the like.

As shown by reference number 145, in some implementations, if the call monitoring system has determined that the call is ongoing, the call monitoring system may transmit a notification to the called device and/or to another device associated with the called party. The notification generally may alert the called party that the call has been identified as suspicious such that the called party may proceed with caution in communicating with the caller (e.g., may end the call, perform additional security checks, refrain from providing any sensitive information despite any appearance of urgency and/or sympathy on the end of the calling device, elevate the call to a supervisory level, or the like).

As shown by reference number 150, in some implementations, the call monitoring system may transmit a notification to a notification device, such as a device associated with a user having an account that is the subject of the call (the account holder). The call monitoring system may transmit the notification while the call is ongoing or after the call has ended. In some implementations, the notification may be a query to the user of the notification device (e.g., the account holder), for example, to query whether or not the user initiated the call from the calling device to the called device or authorized a change to the account. If the user answers "Yes" (e.g., the call monitoring system receives, from the notification device, a data signal corresponding to an answer of "Yes"), then the call monitoring system may refrain from performing any action to mitigate fraud, including ceasing any further capturing and/or analyzing of call audio for synthetic sounds if the call is still ongoing, thereby conserving the use of any further processing resources and/or processing time by the call monitoring system. If the user answers "No" (e.g., the call monitoring system receives from the notification device a data signal corresponding to an answer of "No"), then the call monitoring system may determine that there is fraud associated with the call, and therefore perform further actions to mitigate fraud. For example, if the call is still ongoing, the call monitoring system may transmit a notification to the called device and/or to the other device associated with the called party alerting the called party that the call is fraudulent and/or may disconnect the call, as shown by reference number 155. Alternatively, the call monitoring system may disconnect the call upon detecting the synthetic sound pattern without sending out any notifications and/or may block the phone number from which the call was made for future calls (e.g., add the phone number to a blacklist).

In some implementations, the call monitoring system may identify any changes to one or more records of the account that were made in connection with the call. The records may be stored in a records database, and may include information about a particular account and/or account holder. For example, the records may include, without limitation, personal information (e.g., name, address, birth date, address, social security number, contact information, or the like), account information (e.g., passwords, preferences, answers to security questions, or the like), and/or financial information (e.g., account balance). In some implementations, the call monitoring system may identify changes based on the time the changes were made (e.g., a timestamp for the changes). For example, if the timestamp is during the call or within a set time after the call, then the call monitoring system may determine that the changes were made in connection with the call. Additionally, or alternatively, when a change is made to an account, the call monitoring system may store an indication (e.g., in the records database) that indicates an association between the change (and/or the account to which the change was made) and call audio of a call that resulted in the change. Then, when a synthetic sound is detected in call audio, the call monitoring system may determine a change made based on the call, and may reverse the change, as described below.

As shown by reference number 160, the call monitoring system may then reverse or undo one or more of the changes. The call monitoring system may reverse the one or more changes upon detection of the synthetic sound pattern (indicating a likelihood of fraud) or after a determination of fraud (e.g., confirmation from the account holder that the call was not initiated by the account holder). Additionally, the identification and reversal of the one or more changes may occur while the call is ongoing or after the call has ended (e.g., during post-processing of the call). The call monitoring system may automatically reverse the one or more changes depending upon the nature of the changes and/or characteristics of the records that were changed (e.g., updated). For example, if a name, address, and/or phone number associated with the account were changed, the call monitoring system may change the information back to the information prior to the call. In situations in which a reversal of the changes cannot be performed automatically (e.g., the reversal requires supervisory approval), the call monitoring system may initiate a request to or ticket to have the reversal of the changes performed, for example, by sending a message to a device of a party with authority to make and/or authorize the changes (e.g., a supervisor). As another example, if the changes involve funds of the account (e.g., funds were transferred, a transfer has been requested and/or is in progress, or the like), the call monitoring system may reverse the transfer of funds (e.g., request transfer of funds from the receiving account, repay the account the transferred amount, or the like) or may cancel a transfer request or an in-progress transfer. Such reversals involving funds may be performed automatically or may require supervisory approval.

In some implementations, the call monitoring system may lock the account until the account holder has been contacted (e.g., because the account may have been compromised) as determined by the presence of synthetic sounds during the call and/or because of changes made in connection with the call. Additionally, or alternatively, the call monitoring system may require step-up authentication (e.g., multi-factor authentication) to perform any tasks on and/or to make any changes to the account.

In some implementations, the call monitoring system may calculate a fraud score for the detected synthetic sound pattern (e.g., the sound recording). For example, the fraud score may be calculated based on the number of times the synthetic sound pattern has been used, the number of times a call in which the synthetic sound pattern was used was flagged as fraudulent, and/or the priority indicator of the audio footprint of the synthetic sound pattern, as described above. The call monitoring system may perform the particular action or actions based on the fraud score. For example, if the fraud score is high (e.g., is above a threshold), then the call monitoring system may end the call (if ongoing), lock the account (if the call has ended), and/or block the phone number of the calling device. If the fraud score is low (e.g., below the threshold), then the call monitoring system may simply alert the called party (e.g., the agent), as described above in connection with reference number 145.

As described in detail above, the call monitoring system may monitor a call between a calling device and a called device in real time and/or after the call to detect synthetic sounds existing in the background of the call audio originating from the calling device, which may indicate a likelihood of fraud associated with the call. Accordingly, the call monitoring system may perform one or more actions to prevent and/or remedy consequences resulting from the fraud. In some implementations, the call monitoring system may conduct the analysis and perform the actions in phases to efficiently use computing resources (e.g., processing resources, memory resources, or the like). For example, the call monitoring system may perform first processing (e.g., requiring fewer computing resources) while the call is in progress (e.g., comparing the call audio footprint against the stored audio footprints in the audio database having high priority indicators). The call monitoring system may then perform second processing after the call has ended (e.g., comparing the call audio footprint to the entire audio database).

Implementations further described above conserve processing resources and reduce processing time associated with detecting synthetic audio, which increases the likelihood of detecting synthetic audio while a call is ongoing. By reducing processing time, these implementations enable proactive mitigation techniques to be used while the call is ongoing and perhaps before a malicious action is performed, rather than requiring reactive mitigation techniques to be used after the call and after the malicious action is performed. As a result, computing resources can be conserved via proactive mitigation rather than reactive mitigation.

As indicated above, FIGS. 1A-1C are provided as an example. Other examples may differ from what is described with regard to FIGS. 1A-1C.

Figure 2:
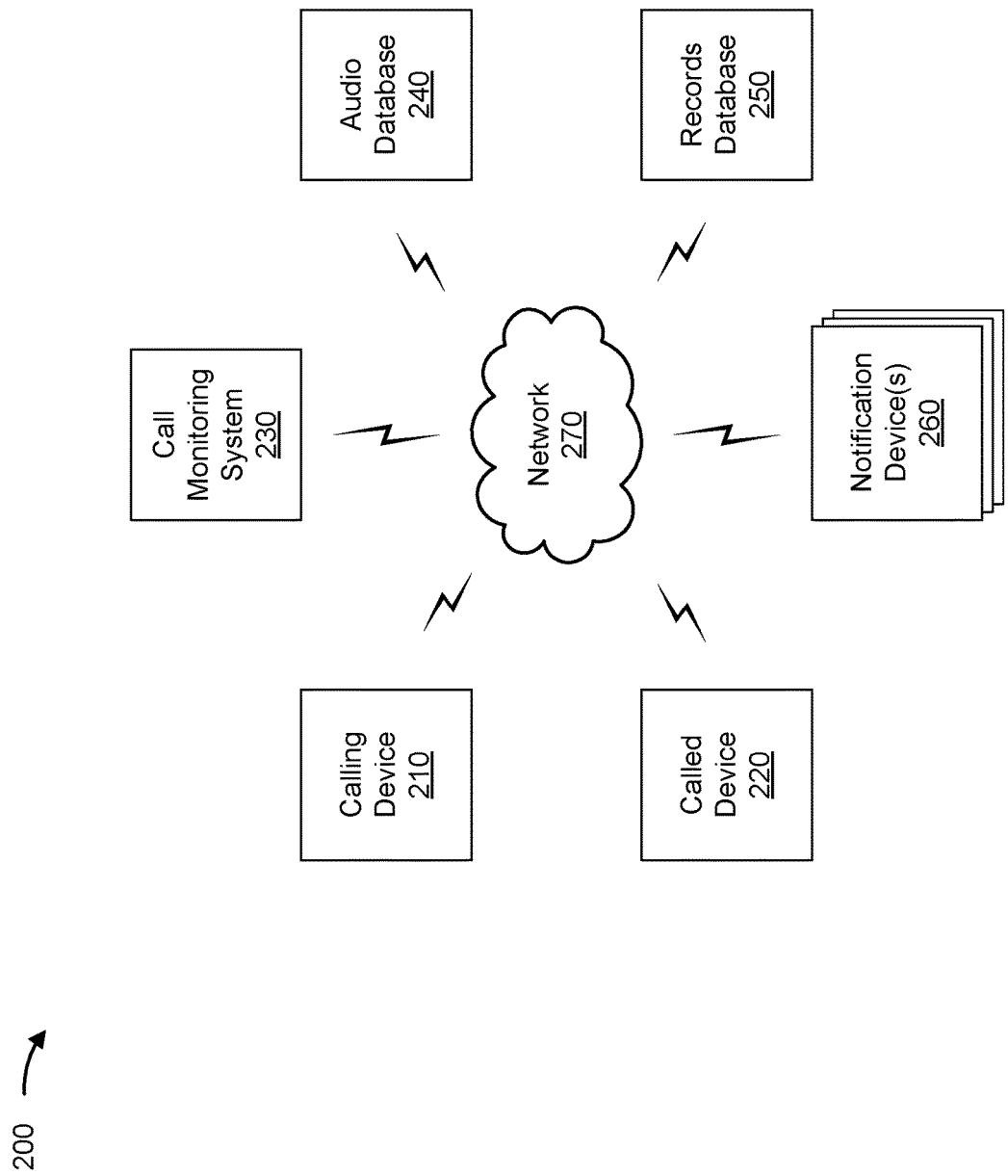
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a calling device 210, a called device 220, a call monitoring system 230, an audio database 240, a records database 250, one or more notification devices 260, and/or a network 270. Devices of environment 200 may interconnect via wired connections, wireless connections, or a combination of wired and wireless connections.

The calling device 210 includes one or more devices capable of making a phone call (i.e., transmitting and receiving audio including a voice audio layer and a background audio layer), as described elsewhere herein. The calling device 210 may include a communication device and/or a computing device. For example, the calling device 210 may include a wireless communication device, a phone, a mobile phone, a landline phone, a user equipment, a laptop computer, a tablet computer, a desktop computer, or a similar type of device.

The called device 220 includes one or more devices capable of making a phone call (i.e., transmitting and receiving audio including a voice audio layer and a background audio layer), as described elsewhere herein. The called device 220 also may be capable of receiving one or more notifications. The called device 220 may include a communication device and/or a computing device. For example, the called device 220 may include a wireless communication device, a phone, a mobile phone, a landline phone, a user equipment, a laptop computer, a tablet computer, a desktop computer, or a similar type of device. In some implementations, the called device 220 may include multiple devices, such as a first device for engaging in a phone call and a second device for receiving notifications (e.g., the notification device 260).

The call monitoring system 230 includes one or more devices capable of receiving, generating, storing, processing, providing, and/or routing information associated with detecting synthetic sounds in call audio, as described elsewhere herein. The call monitoring system 230 may include a communication device and/or a computing device. For example, the call monitoring system 230 may include a server, such as an application server, a client server, a database server, a host server, or a server in a cloud computing system. In some implementations, the call monitoring system 230 includes computing hardware used in a cloud computing environment.

The audio database 240 includes one or more devices capable of receiving, generating, storing, processing, and/or providing information associated with detecting synthetic sounds in call audio, as described elsewhere herein. The audio database 240 may include a communication device and/or a computing device. For example, the audio database 240 may include a data structure, a database, a data source, a server, a database server, an application server, a virtual server (e.g., executing on computing hardware), a server in a cloud computing system, a device that includes computing hardware used in a cloud computing environment, or a similar type of device. As an example, the audio database 240 may store audio samples identified as synthetic sounds, audio footprints, or the like, as described elsewhere herein.

The records database 250 includes one or more devices capable of receiving, generating, storing, processing, and/or providing information associated with detecting synthetic sounds in call audio, as described elsewhere herein. The records database 250 may include a communication device and/or a computing device. For example, the records database 250 may include a data structure, a database, a data source, a server, a database server, an application server, a virtual server (e.g., executing on computing hardware), a server in a cloud computing system, a device that includes computing hardware used in a cloud computing environment, or a similar type of device. As an example, the records database 250 may store personal, financial, and/or other sensitive information of an account holder, as described elsewhere herein.

The notification device 260 includes one or more devices capable of receiving one or more notifications, as described elsewhere herein. The notification device 260 also may be capable of transmitting information to one or more other devices, such as the call monitoring system 230 and/or another notification device 260. The notification device 260 may include a communication device and/or a computing device. For example, the notification device 260 may include a wireless communication device, a phone, a mobile phone, a landline phone, a user equipment, a laptop computer, a tablet computer, a desktop computer, or a similar type of device.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
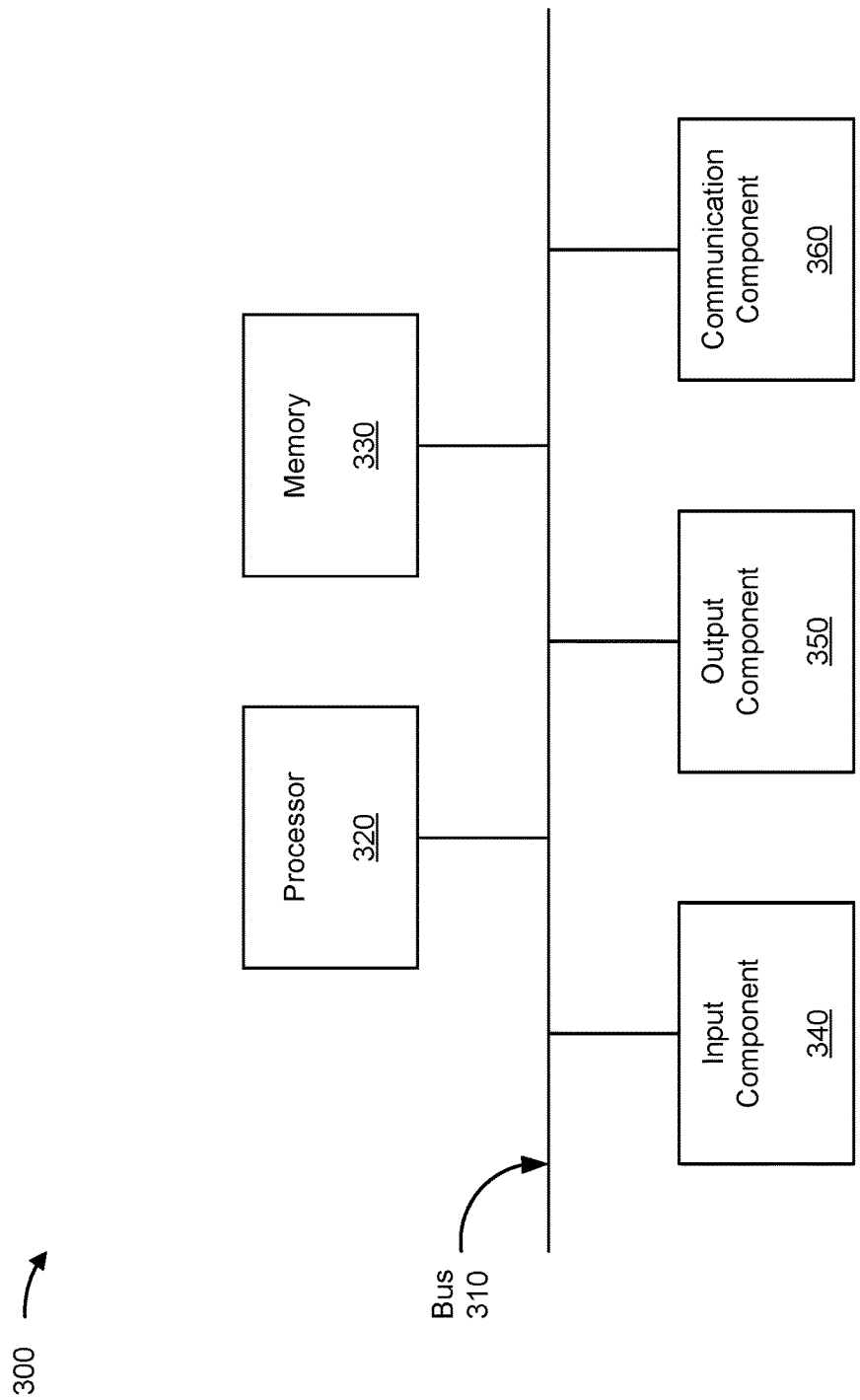
FIG. 3 is a diagram of example components of one or more devices of FIG. 2.

FIG. 3 is a diagram of example components of a device 300, which may correspond to the calling device 210, the called device 220, the call monitoring system 230, the audio database 240, the records database 250, and/or the one or more notification devices 260. In some implementations, the calling device 210, the called device 220, the call monitoring system 230, the audio database 240, the records database 250, and/or the one or more notification devices 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
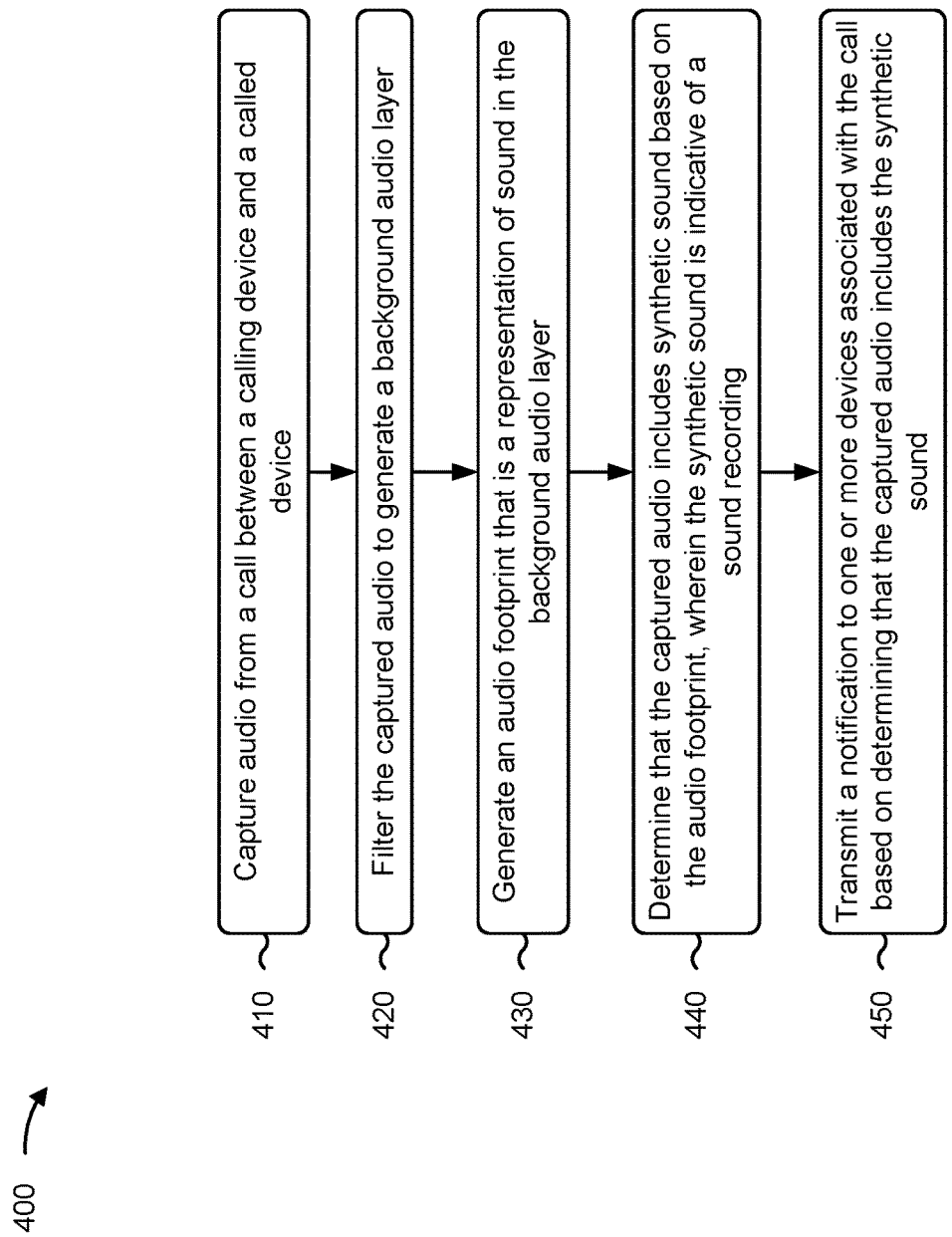
FIG. 4 is a flowchart of an example process relating to detecting synthetic sounds in call audio.

FIG. 4 is a flowchart of an example process 400 associated with detecting synthetic sounds in call audio. In some implementations, one or more process blocks of FIG. 4 may be performed by a system (e.g., call monitoring system 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include capturing audio from a call between a calling device and a called device (block 410). As further shown in FIG. 4, process 400 may include filtering the captured audio to generate a background audio layer (block 420). As further shown in FIG. 4, process 400 may include generating an audio footprint that is a representation of sound in the background audio layer (block 430). As further shown in FIG. 4, process 400 may include determining that the captured audio includes synthetic sound based on the audio footprint, wherein the synthetic sound is indicative of a sound recording (block 440). As further shown in FIG. 4, process 400 may include transmitting a notification to one or more devices associated with the call based on determining that the captured audio includes the synthetic sound (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting synthetic sounds in call audio, the system comprising:
one or more memories; and
one or more processors, communicatively coupled to the one or more memories, configured to:
capture audio from a call between a calling device and a called device;
filter, based on one or more audio characteristics of the captured audio, the captured audio to remove one or more voices;
generate a background audio layer based on filtering the captured audio to remove the one or more voices;
generate an audio footprint that is a representation of sound in the background audio layer;
determine that the background audio layer includes a triggering sound pattern based on analyzing the audio footprint;
detect a synthetic sound pattern in the background audio layer based on determining that the background audio layer includes the triggering sound pattern, wherein the synthetic sound pattern is detected based on at least one of:
a first portion of the audio footprint sufficiently matching a second portion of the audio footprint, or
comparing a portion of the audio footprint to a plurality of stored audio footprints based on a plurality of priority indicators corresponding to the plurality of stored audio footprints and the portion of the audio footprint sufficiently matching a stored audio footprint, wherein the stored audio footprint is not generated from the captured audio; and
transmit a notification to one or more devices associated with the call based on detecting the synthetic sound pattern.

2. The system of claim 1, wherein the one or more processors, to detect the synthetic sound pattern, are configured to:
detect the synthetic sound pattern based on the first portion of the audio footprint sufficiently matching the second portion of the audio footprint,
wherein one of the first portion or the second portion includes the triggering sound pattern, and
wherein a duration of the triggering sound pattern satisfies a threshold.

3. The system of claim 1, wherein the one or more processors, to detect the synthetic sound pattern, are configured to:
detect the synthetic sound pattern based on the portion of the audio footprint sufficiently matching the stored audio footprint,
wherein the portion of the audio footprint includes the triggering sound pattern, and
wherein a duration of the triggering sound pattern satisfies a threshold.

4. The system of claim 1, wherein the one or more processors are further configured to:
determine a category of the triggering sound pattern; and
identify the plurality of stored audio footprints, including the stored audio footprint, based on the category of the triggering sound pattern.

5. The system of claim 1, wherein the one or more processors are further configured to:
determine an order for comparing the portion of the audio footprint to the plurality of stored audio footprints based on the plurality of priority indicators corresponding to the plurality of stored audio footprints,
wherein each priority indicator indicates a quantity of times that a corresponding stored audio footprint was sufficiently matched;
wherein the one or more processors, to detect the synthetic sound pattern, are configured to:
compare the audio footprint to one or more stored audio footprints, of the plurality of stored audio footprints, based on the order; and
detect the synthetic sound pattern based on the portion of the audio footprint sufficiently matching the stored audio footprint, wherein the stored audio footprint is included in the plurality of stored audio footprints; and
wherein the one or more processors are further configured to:
modify a priority indicator associated with the stored audio footprint based on detecting the synthetic sound pattern.

6. The system of claim 1, wherein the one or more processors, to transmit the notification to the one or more devices associated with the call, are configured to:
transmit the notification to a device associated with a called party, that is using the called device to participate in the call, based on a determination that the call is ongoing.

7. The system of claim 1, wherein the one or more processors, to transmit the notification to the one or more devices associated with the call, are configured to:
transmit the notification to a device associated with a user for which a record was updated in connection with the call.

8. The system of claim 1, wherein the one or more processors are further configured to:
determine whether the call is ongoing or has ended; and
identify the one or more devices to which the notification is to be transmitted based on determining whether the call is ongoing or has ended.

9. The system of claim 1, wherein the one or more processors are further configured to:
identify a change to a record that was made in connection with the call; and
reverse the change to the record based on detecting the synthetic sound pattern.

10. A method for detecting synthetic audio in call audio, comprising:
capturing, by a system, audio from a call between a calling device and a called device;
filtering, by the system and based on one or more audio characteristics of the captured audio, the captured audio to generate a background audio layer;
generating, by the system, an audio footprint that is a representation of sound in the background audio layer;
determining, by the system, that the audio footprint includes a triggering sound footprint based on one or more audio characteristics of the audio footprint;
detecting, by the system, synthetic sound based on the audio footprint and after determining that the audio footprint includes the triggering sound footprint,
wherein the synthetic sound is indicative of a sound recording, and
wherein the synthetic sound is detected based on at least one of:
a first portion of the audio footprint sufficiently matching a second portion of the audio footprint, or comparing a portion of the audio footprint to a plurality of stored audio footprints based on a plurality of priority indicators corresponding to the plurality of stored audio footprints and the portion of the audio footprint sufficiently matching a stored audio footprint, wherein the stored audio footprint is not generated from the captured audio; and transmitting, by the system, a notification to one or more devices associated with the call based on detecting the synthetic sound.

11. The method of claim 10, wherein filtering the captured audio to generate the background audio layer comprises:

removing, from the captured audio, all audio originating from the called device; and removing a voice from audio originating from the calling device.

12. The method of claim 10, wherein detecting the synthetic sound includes determining that the audio footprint includes a third portion and a fourth portion that are inconsistent with one another.

13. The method of claim 10, wherein detecting the synthetic sound includes determining that the audio footprint includes a third portion, indicative of a muted sound, and a fourth portion indicative of an unmuted sound other than voice audio.

14. The method of claim 10, wherein detecting the synthetic sound includes determining that the audio footprint includes a characteristic indicative of recorded audio.

15. The method of claim 10, further comprising:

determining an order for comparing the portion of the audio footprint to the plurality of stored audio footprints based on the plurality of priority indicators corresponding to the plurality of stored audio footprints, wherein each priority indicator indicates a quantity of times that a corresponding stored audio footprint was sufficiently matched.

16. The method of claim 10, further comprising:

modifying a priority indicator associated with the stored audio footprint based on detecting the synthetic sound.

17. A non-transitory computer-readable medium storing a set of instructions, the set of instructions comprising:

one or more instructions that, when executed by one or more processors of a system, cause the system to:

capture audio from a call between a calling device and a called device;

filter, based on one or more audio characteristics of the captured audio, the captured audio to generate a background audio layer;

generate an audio footprint that is a representation of sound in the background audio layer;

determine that the captured audio includes synthetic sound based on the audio footprint, wherein the synthetic sound is indicative of a sound recording, and wherein the synthetic sound is detected based on at least one of:

a first portion of the audio footprint sufficiently matching a second portion of the audio footprint, or comparing a portion of the audio footprint to a plurality of stored audio footprints based on a plurality of priority indicators corresponding to the plurality of stored audio footprints and the portion of the audio footprint sufficiently matching a stored audio footprint, wherein the stored audio footprint is not generated from the captured audio; and transmit a notification to one or more devices associated with the call based on determining that the captured audio includes the synthetic sound.

18. The non-transitory computer-readable medium of claim 17, wherein the one or more instructions further cause the system to:

determine that the audio footprint includes a triggering sound footprint based on one or more audio characteristics of the audio footprint; and wherein the one or more instructions, that cause the system to determine that the captured audio includes the synthetic sound, cause the system to:

determine that the captured audio includes the synthetic sound after determining that the audio footprint includes the triggering sound footprint.

19. The non-transitory computer-readable medium of claim 17, wherein the one or more instructions further cause the system to:

determine an order for comparing the portion of the audio footprint to the plurality of stored audio footprints based on the plurality of priority indicators corresponding to the plurality of stored audio footprints, wherein each priority indicator indicates a quantity of times that a corresponding stored audio footprint was sufficiently matched.

20. The non-transitory computer-readable medium of claim 17, wherein the one or more instructions further cause the system to:

modify a priority indicator associated with the stored audio footprint based on detecting the synthetic sound.

* * * * *